(12) United States Patent
Tumelty et al.

(10) Patent No.: US 7,509,793 B2
(45) Date of Patent: Mar. 31, 2009

(54) FLUID SYSTEM

(75) Inventors: Mark J Tumelty, Derby (GB);
Christopher J Ellans, Derby (GB)

(73) Assignee: Rolls-Royce plc., London (GB)

( * ) Notice: Subject to any disclaimer, the term of this patent is extended or adjusted under 35 U.S.C. 154(b) by 0 days.

(21) Appl. No.: 11/806,912

(22) Filed: Jun. 5, 2007

(65) Prior Publication Data
US 2008/0105493 A1 May 8, 2008

Related U.S. Application Data

(63) Continuation of application No. 10/909,330, filed on Aug. 3, 2004, now Pat. No. 7,287,368.

(30) Foreign Application Priority Data
Aug. 6, 2003 (GB) ............... 0318400.9

(51) Int. Cl.
*F02C 7/06* (2006.01)
*F02C 7/224* (2006.01)
(52) U.S. Cl. .................... 60/39.08; 60/736
(58) Field of Classification Search ............ 60/39.08, 60/734, 736; 184/6.11; 417/292, 307
See application file for complete search history.

(56) References Cited

U.S. PATENT DOCUMENTS 4,041,697 A * 8/1977 Coffinberry et al. ......... 60/39.08
4,151,710 A * 5/1979 Griffin et al. ............... 60/39.08
5,121,599 A * 6/1992 Snyder et al. ............... 60/39.08

FOREIGN PATENT DOCUMENTS

WO 94/20739 A1 9/1994
WO 00/79103 A1 12/2000

OTHER PUBLICATIONS

ASME GT2008-50450, Ken Hart, "Basic architecture and sizing of commercial aircraft gas turbine oil feed systems," proceedings of ASME Turbo Expo 2008, Jun. 9-13, 2008, Berlin, Germany.

* cited by examiner

*Primary Examiner*—Louis J Casaregola
(74) *Attorney, Agent, or Firm*—Jeffrey S. Melcher; Manelli Denison & Selter, PLLC

(57) ABSTRACT

In a fluid system for a gas turbine engine, oil is supplied from an oil tank (10) by a constant displacement pump (12) to lubricate engine components (18). The oil is supplied to the components (18) via a heat exchanger (16) in which oil and fuel are placed in direct heat exchange relationship.

The flow of oil to the components (18) is controlled by recirculating a proportion of the oil flow through a bypass (20). The bypass (20) regulates the flow of oil to the components (18) so that the amount of heat transferred to the fuel in the heat exchanger (16) is controlled. At low engine powers a greater proportion of the oil flows through the bypass (20) to reduce the oil flow to the components (18). This reduces the heat transferred to the fuel in the heat exchanger (16) and so prevents overheating of the fuel.

2 Claims, 3 Drawing Sheets

FLUID SYSTEM

This application is a Continuation Application of National Application No. 10/909,330 filed Aug. 3, 2004 now U.S. Pat. No. 7,287,368.

FIELD OF THE INVENTION

The present invention relates to a fluid system for an engine and in particular to a fluid system for use in a gas turbine engine. In a fluid system in accordance with the present invention heat is transferred from the engine lubrication system into the engine fuel system.

BACKGROUND OF THE INVENTION

During operation of a gas turbine engine heat is generated in various parts of the engine and its accessories and this heat is transported around by the engine's fluid flow systems.

It is common practice in gas turbine engines to transfer heat from the engines lubrication system into the fuel system by means of a heat exchanger. The lubricating oil picks up heat from bearings, the pumping process and other sources and transfers this heat to the fuel as it passes through the heat exchanger. This heat transfer prevents the oil overheating and raises the fuel temperature prior to combustion.

As gas turbine shaft speeds and cycle temperatures have increased it has become necessary to increase oil flows. These increased oil flows are only required at high engine powers, however because the oil pumps are constant displacement units the oil flows have also increased at low engine powers. The result is that at low powers an increased amount of heat is rejected into the fuel system.

One solution to this problem is to manage the excessive fuel temperatures at low powers by the use of an additional heat exchanger. Air, which bypasses the core engine, is used to cool the fuel either directly or to pre-cool the oil to reduce the fuel temperature. The exact configuration used is determined by the application however both configurations require the use of a valve to turn the airflow on/off to minimise any performance penalty when the extra cooling is not required.

The use of an additional heat exchanger to manage the excessive fuel temperatures involves a significant penalty in terms of engine weight, cost and specific fuel efficiency.

SUMMARY OF THE INVENTION

The present invention seeks to provide a fluid system in which the excessive fuel temperatures are controlled without the use of an additional heat exchanger.

According to one aspect of the present invention a fluid system for an engine comprises means for supplying a first and a second fluid to the engine via a heat exchanger in which the fluids are placed in direct heat exchange relationship, the flow of the first fluid to the engine is reduced to reduce the amount of heat transferred from the first fluid to the second fluid in the heat exchanger.

The flow of the first fluid may be reduced by recirculating a proportion of the first fluid upstream of the engine or by supplying the first fluid by a variable capacity pump.

According to a further aspect of the present invention a fluid system for an engine comprises means for supplying a first and a second fluid to a heat exchanger in which the fluids are placed in direct heat exchange relationship, the means of supplying the first fluid is a constant displacement pump the output of which is regulated by recirculating a proportion of the first fluid upstream of the engine to reduce the flow of the first fluid to the engine and control the amount of heat transferred from the first fluid of the second fluid in the heat exchanger.

Preferably any of the first fluid in excess of the engine requirements is recirculated.

In one embodiment of the present invention the constant displacement pump has an inlet and an outlet and a proportion of the first fluid is recirculated through a bypass that connects the outlet of the pump to the pump inlet.

In a further embodiment of the present invention a bypass connects an outlet from the heat exchanger to an inlet of the pump through which a proportion of the first fluid is recirculated.

Alternatively a filter is provided in flow series between the pump and the heat exchanger and a proportion of the first fluid may be recirculated through a bypass that connects an outlet of the filter to an inlet of the pump.

A valve controls the amount of the first fluid that is recirculated. The valve may be operated by a spring or by changes in pressure or temperature. Alternatively the bypass may be controlled by an electronic control system, which also controls the engine.

In the preferred embodiment of the present invention the first fluid is a lubricant and the second fluid is fuel. The lubricant is oil and heat is transferred from the oil to the fuel.

BRIEF DESCRIPTION OF THE DRAWINGS

The present invention will now be described with reference to the accompanying figures in which.

DETAILED DESCRIPTION OF THE INVENTION

In a gas turbine engine (not shown) heat is transferred from a lubrication system into a fuel system by means of a heat exchanger 16.

Figure 1:
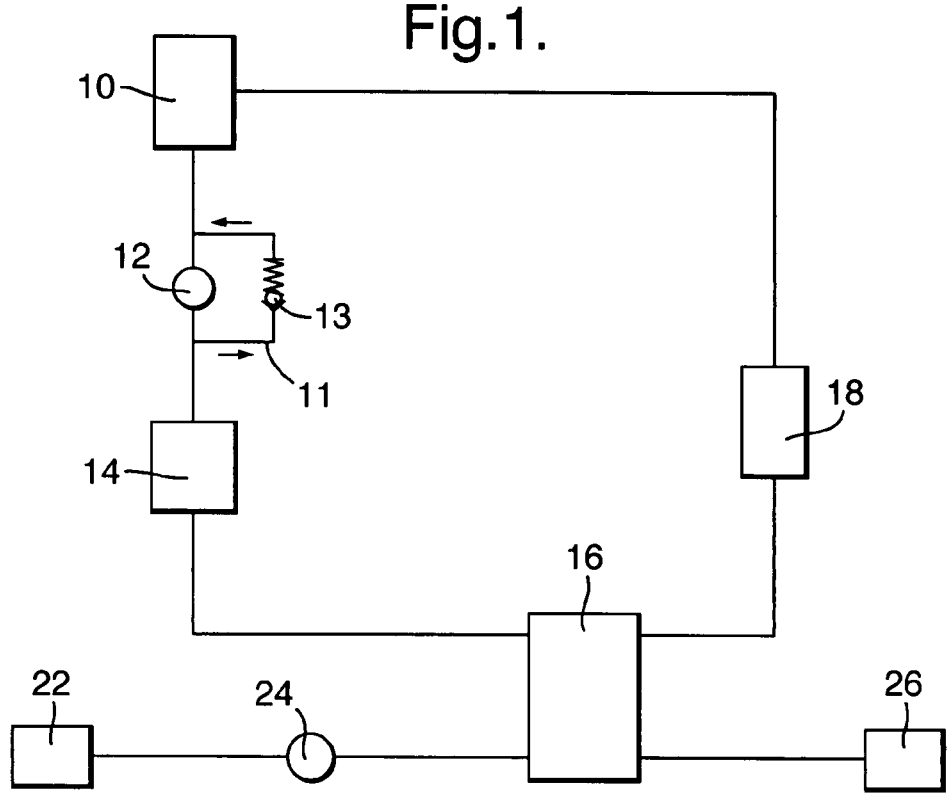
FIG. 1 is a schematic view of a fluid system in accordance with a first embodiment of the present invention.
Figure 2:
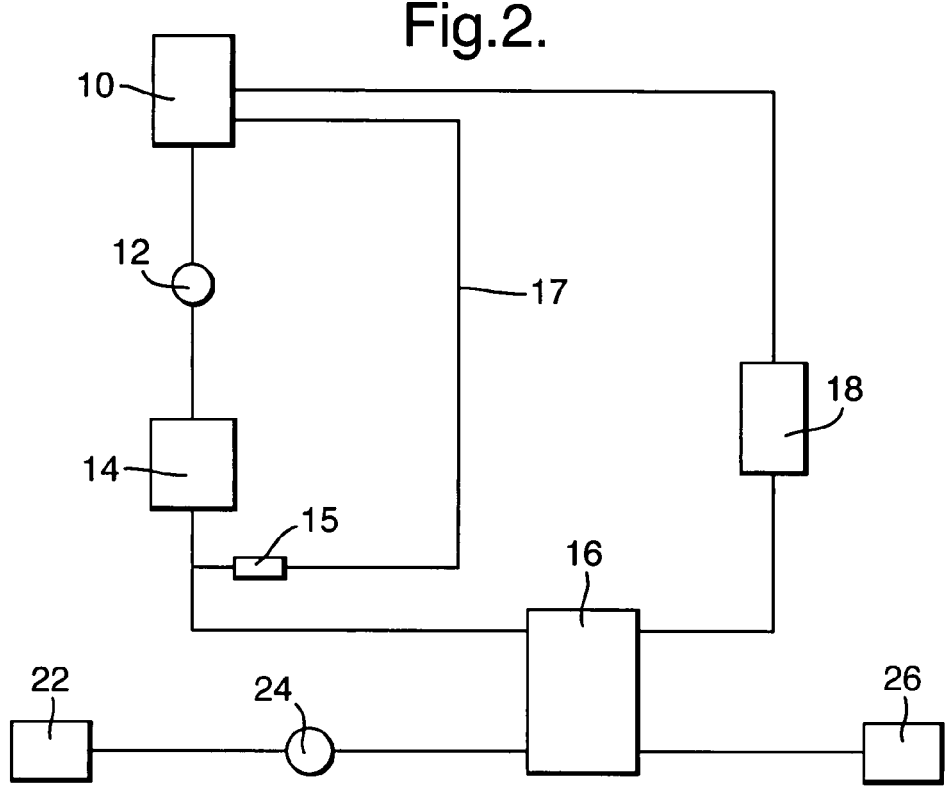
FIG. 2 is a schematic view of a fluid system in accordance with a second embodiment of the present invention.
Figure 3:
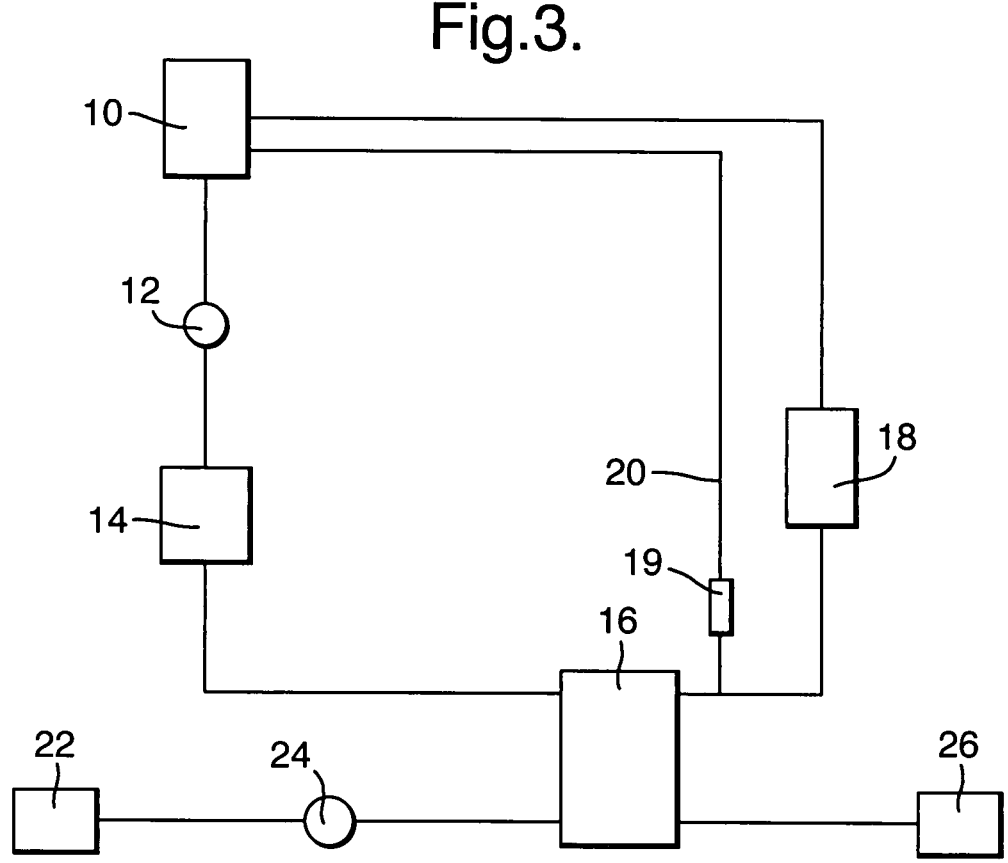
FIG. 3 is a schematic view of a fluid system in accordance with a third embodiment of the present invention.

The lubrication systems, as shown in FIGS. 1-3, includes an oil tank 10, a constant displacement oil pump 12 and a filter 14 in flow series. The pump 12 takes oil from the tank 10 and pumps it through the filter 14 to the inlet of the heat exchanger 16. The oil passes through the heat exchanger 16 on route to lubricated components 18, such as the engine bearings. The lubricating oil picks up heat from the bearings and any other lubricated components 18 before it is returned to the oil tank 10.

The fuel system includes a fuel tank 22 and a fuel. pump 24 in flow series. Fuel is pumped from the tank 22 to the inlet of the heat exchanger 16. The fuel then passes from the heat exchanger 16 to fuel injectors 26, which deliver the fuel into the engines combustion chamber (not shown).

Heat is transferred from the oil to the fuel in the heat exchanger 16. This heat transfer prevents the oil from. overheating and raises the temperature of the fuel prior to combustion. The amount of heat rejected by the oil system is proportional to the amount of oil that flows to the lubricated components 18.

At high engine powers shaft speeds increase and the lubricated components 18 require all of the oil delivered by the constant displacement oil pump 12. Heat is transferred from the oil to the fuel in the heat exchanger 16 to heat the fuel prior to combustion.

At low engine powers the oil pump 12 delivers oil in excess to the engines requirements. To reduce the amount of oil delivered to the lubricated components 18 a proportion of the oil flow is recirculated back to the oil tank 10. The oil can be recirculated from any position downstream of the pump 12 but upstream of the components 18. By reducing the amount of oil delivered to the components 18 the temperature of the oil in the heat exchanger 16 is reduced.

In the embodiment shown in FIG. 1 the amount of oil delivered by the pump 12 is regulated by the use of a bypass 11 around the pump 12. The bypass 11 connects the outlet of the oil pump 12 to the inlet and a valve 13 controls the amount of oil that passes through the bypass 11. The valve 13 is a sprung valve, which opens and closes in response to the pressure rise across the oil pump 12. At low engine powers when the pressure rise across the oil pump 12 is low, oil passes through an orifice in the valve 13. The oil flows from the outlet of the pump 12 through the valve 13 back to the pump inlet. By passing a proportion of the oil around the bypass 11 the net pump delivery is reduced. As the engine power increases and the pump pressure rises, the valve 13 moves to close the orifice and the pump delivers its full flow to the components 18.

In the embodiment of the present invention shown in FIG. 2 the amount of oil, delivered by the pump 12 to the components 18, is regulated by a bypass 17. The bypass 17 connects the outlet of the filter 14 to the oil tank 10. A valve 15 controls the amount of oil that passes through the bypass 17. The valve 19 operates to allow oil through the bypass 17 at low engine powers. As engine power increases the valve 19 closes so that the pump 12 delivers its full flow to the components 18.

FIG. 3 shows a further embodiment of the present invention in which a bypass 20 connects the outlet of the heat exchanger 16 to the oil tank 10. A valve 19 controls the amount of oil passing through the bypass 20 depending on the engine operating conditions.

Figure 4:
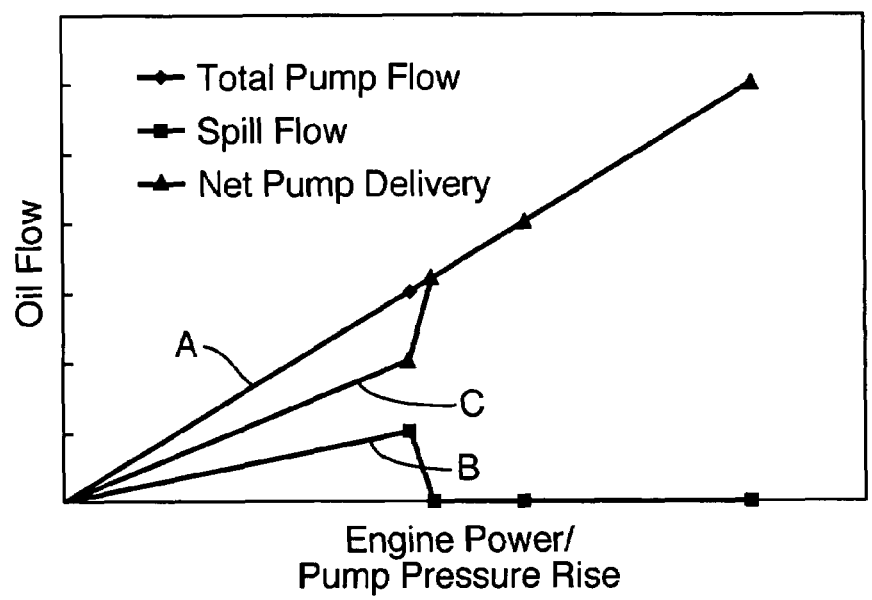
FIG. 4 is a graph showing the effect on the flow rate of a fluid in the fluid systems shown in FIGS. 1-3.

FIG. 4 shows the effect the bypasses 11, 17 and 20 have on oil flow. Line A shows the oil flow without the use of a bypass. When the valve 13,15 or 19 opens oil flows through the bypass shown by line B in FIG. 2 and the net pump delivery is reduced, line C in FIG. 2. As the pressure rise increase across the pump 12 the spill valve 13, 15 or 19 closes to shut off the bypass and the pump delivery follows line A.

Figure 5:
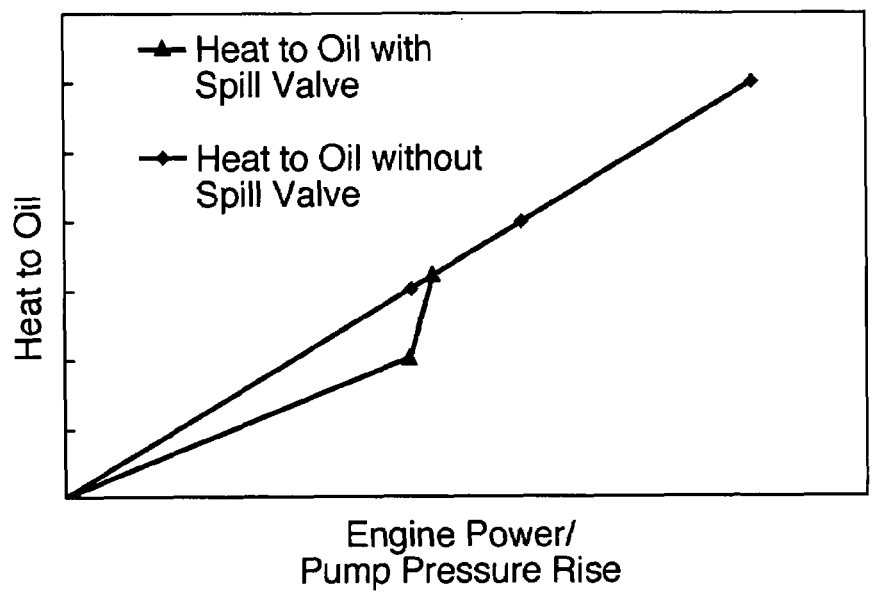
FIG. 5 is a graph showing the amount of heat transferred to a fluid in the fluid systems shown in FIGS. 1-3.

FIG. 5 shows the effect that the oil spill through the bypass has on the amount of heat in the oil. The upper line shows the heat in the oil without the bypass and the lower line shows the reduction in this heat when the bypass is used.

Whilst the present invention has been described with reference to a sprung valve controlled by the pressure rise across the oil pump 12 it will be appreciated that other types of valves may be used and these may be controlled differently. For example the valves may be controlled by fuel temperature so that as the temperature of the fuel increases the valve opens to allow a flow of oil through the bypass 11, 17 or 20. Alternatively the valve could be actively controlled by commands from the engine control to open and close the valve in response to the engine power setting.

In all the embodiments of the present invention the oil flow rate to the components 18 is regulated to control the amount of heat transferred to the fuel. By reducing the oil flow at low engine powers the fuel temperature is reduced. This prevents overheating of the fuel.

It will be appreciated by one skilled in the art that the same effect can be achieved by replacing the constant displacement pump 12 with a variable capacity oil pump such as an electric pump or variable displacement pump. The variably capacity oil pump operates to reduce the oil flow at low engine power to reduce the fuel temperature and prevent overheating of the fuel.

We claim:

1. A gas turbine engine oil system for regulating heat transferred from a lubrication oil to a fuel and regulate the temperature of the lubrication oil:

a heat exchanger;

a tank constructed for containing lubrication oil in communication with the heat exchanger;

a first pump constructed and arranged for pumping lubrication oil through engine components and for pumping lubrication oil from the tank through the heat exchanger during operation of the engine;

a fuel tank in communication with the heat exchanger;

a second pump for transferring fuel from the fuel tank to the heat exchanger such that heat can be transferred from the lubrication oil to the fuel during operation of the engine; and a valve in a first pump bypass constructed and arranged to regulate a flow of lubrication oil recirculated though the first pump bypass to the tank instead of the engine components and thereby control a temperature of the lubrication oil, such that as the flow to the fist pump bypass is increased the amount of heat transferred to the fuel is reduced.

2. A gas turbine engine oil system according to claim 1, wherein the valve is pressure operated.

* * * * *